United States Patent
Dennis et al.

(10) Patent No.: US 9,791,129 B2
(45) Date of Patent: Oct. 17, 2017

(54) HYBRID LIGHT ASSEMBLY

(71) Applicant: Lightforce Australia Pty Ltd., Hindmarsh (AU)

(72) Inventors: Raymond L. Dennis, Hindmarsh (AU); Robert T. Dall, Athelstone (AU)

(73) Assignee: Lightforce Australia Pty Ltd., Hindmarsh (AU)

(*) Notice: Subject to any disclaimer, the term of this patent is extended or adjusted under 35 U.S.C. 154(b) by 215 days.

(21) Appl. No.: 14/857,065

(22) Filed: Sep. 17, 2015

(65) Prior Publication Data

US 2016/0003444 A1     Jan. 7, 2016

Related U.S. Application Data

(63) Continuation-in-part of application No. 14/011,130, filed on Aug. 27, 2013, now Pat. No. 9,163,803.

(51) Int. Cl.
*B60Q 1/00* (2006.01)
*F21V 7/06* (2006.01)
(Continued)

(52) U.S. Cl.
CPC .............. *F21V 7/06* (2013.01); *B60Q 1/0052* (2013.01); *B60Q 1/0058* (2013.01);
(Continued)

(58) Field of Classification Search
CPC ........................... B60Q 1/0041–1/0058; F21S 48/115–48/1163; F21S 48/1195;
(Continued)

(56) References Cited

U.S. PATENT DOCUMENTS 2,190,035 A    2/1940  Loungway
3,759,084 A    9/1973  Plewka
(Continued)

FOREIGN PATENT DOCUMENTS

CN    202040625 U    11/2011
CN    203757408 U    8/2014
(Continued)

OTHER PUBLICATIONS

Australian Patent Office, International Search Report issued in Australian Patent Application No. PCT/AU2016/000326, 8 pages.

*Primary Examiner* — Anh Mai
*Assistant Examiner* — Steven Horikoshi
(74) *Attorney, Agent, or Firm* — Wood Herron & Evans LLP

(57) ABSTRACT

Disclosed is a hybrid lamp assembly (44) which includes a substantially parabolic primary reflector (12) having an open end (20) and a circumferential mounting member (54) extending outwardly from the open end (20) of the primary reflector (12). A primary light source (14) is operably assembled with the parabolic reflector (12). A secondary light source (46), comprising a plurality of LED lamps (48) and a plurality of substantially parabolic reflectors (50) associated with the plurality of LED lamps (48) and configured to project secondary light beams, is positioned circumferentially around the open end (20). The LED lamps (48) each are mounted to project light directed by the secondary reflector (50) with which it is associated. Upper and lower reflectors (50a, 50b) project light beams substantially parallel to the beam of the primary light source (14) and lateral reflectors (50c-j) are angled inwardly in a horizontal plane to project light beams that cross the beam of the primary light source (14).

4 Claims, 8 Drawing Sheets

(51) Int. Cl.
  *F21V 13/04* (2006.01)
  *F21S 8/10* (2006.01)
(52) U.S. Cl.
  CPC ....... *F21S 48/1104* (2013.01); *F21S 48/1159* (2013.01); *F21S 48/1168* (2013.01); *F21S 48/1186* (2013.01); *F21S 48/1195* (2013.01); *F21V 13/04* (2013.01)
(58) Field of Classification Search
  CPC .... F21V 5/007; F21V 7/0083; F21Y 2105/00; F21Y 2105/10; F21Y 2105/12; F21Y 2105/14; F21Y 2105/18; F21Y 2113/00; F21Y 2113/10; F21Y 2113/13; F21Y 2113/20; F21Y 2103/33
  See application file for complete search history.

(56) References Cited

U.S. PATENT DOCUMENTS

| | | |
|---|---|---|
| 4,680,678 A | 7/1987 | Iwaki |
| 5,374,876 A | 12/1994 | Horibata et al. |
| 5,595,438 A | 1/1997 | Burd |
| 5,685,637 A | 11/1997 | Chapman et al. |
| 5,984,494 A | 11/1999 | Chapman et al. |
| 6,132,071 A | 10/2000 | Yuen |
| 6,447,155 B2 | 9/2002 | Kondo et al. |
| 6,471,368 B1 | 10/2002 | Lin |
| 6,733,163 B1 | 5/2004 | Wang |
| 6,896,397 B2 | 5/2005 | Yamada et al. |
| 6,909,239 B2 | 6/2005 | Gauna |
| 7,118,245 B1 | 10/2006 | Herrington |
| 7,144,144 B2 | 12/2006 | Hsu |
| 7,276,025 B2 | 10/2007 | Roberts et al. |
| 7,281,833 B2 | 10/2007 | Akiyama |
| 7,458,934 B2 | 12/2008 | Roberts et al. |
| 7,543,952 B1 | 6/2009 | Chang |
| 2007/0091632 A1 | 4/2007 | Glovatsky et al. |
| 2010/0039824 A1 | 2/2010 | Wang |
| 2015/0062894 A1 | 3/2015 | Dennis |

FOREIGN PATENT DOCUMENTS

| | | |
|---|---|---|
| DE | 10160052 A1 | 6/2003 |
| DE | 10336974 A1 | 3/2005 |
| JP | 2005302303 A | 10/2005 |

HYBRID LIGHT ASSEMBLY

RELATED APPLICATION

This application is a continuation-in-part of co-pending U.S. patent application Ser. No. 14/011,130, filed Aug. 27, 2013.

FIELD OF THE INVENTION

This invention relates to a light assembly that combines a primary light source, such as an incandescent or high intensity discharge (HID) lamp having a reflector, with a circumferential array of light emitting diode (LED) lamps that are mounted to produce an evenly distributed blanket of light over a defined area calculated by optical requirements.

BACKGROUND OF THE INVENTION

Vehicle lighting devices have been produced that combine light sources of different types. In some examples, the purpose of the combination is purely ornamental or decorative. In other examples, the combination serves to provide light in two different spectra, such as visible and infrared or in two different visible spectrum colors. In yet other examples, light sources of different types are combined to provide energy efficiency.

Generally, auxiliary vehicle lights are designed to producing either a narrow (pencil) long-range beam or a spread-beam (driving) pattern. Some lights can be configured for either pattern, but not both at the same time. Still others are designed for use in foggy situations, providing a wide, bar-shaped beam of light with a sharp cutoff at the top to reduce the glare-back from fog or falling snow, and are generally aimed and mounted low.

SUMMARY OF THE INVENTION

Disclosed is a hybrid lamp assembly which includes a substantially parabolic reflector having an open end and a circumferential mounting member extending outwardly from the open end of the reflector. The mounting member presents a plurality of nonparallel mounting surfaces. A primary light source is operably assembled with the parabolic reflector. Typically, but not necessarily, the primary light source is a non-LED light source. A secondary light source, comprising a plurality of LED lamps, is positioned circumferentially around the open end on the mounting surfaces. The LED lamps are each mounted to project in a direction substantially normal to the surface on which it is mounted.

According to other aspects of the invention, the LED lamps may be situated in pairs on each of the mounting surfaces. The assembly may also include a housing in which the reflector, mounting member and light sources are mounted and a lens. The primary light source may be configured to project a long-range beam of light and the LEDs of the secondary light source configured to project a shorter range blanket of light.

The mounting member may include upper and lower mounting surfaces substantially normal to the beam of the primary light source and lateral mounting surfaces angled inwardly to cross the beam of the primary light source.

Also disclosed is an alternate embodiment in which the circumferentially located LED lamps have associated substantially parabolic reflectors.

Other aspects, features, benefits, and advantages of the present invention will become apparent to a person of skill in the art from the detailed description of various embodiments with reference to the accompanying drawing figures, all of which comprise part of the disclosure.

BRIEF DESCRIPTION OF THE DRAWING

Like reference numerals are used to indicate like parts throughout the various figures of the drawing, wherein.

DETAILED DESCRIPTION

Figure 1:
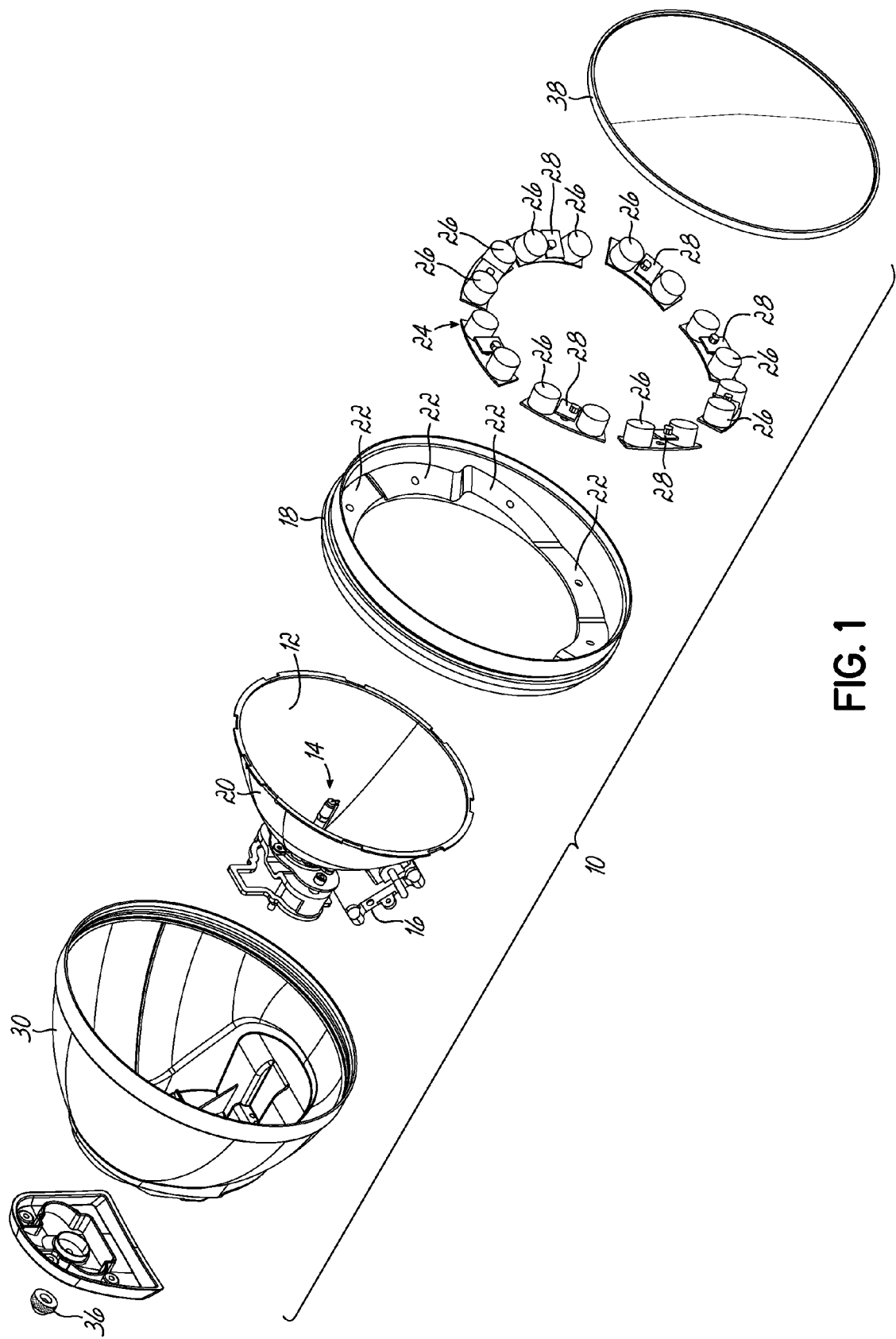
FIG. 1 is an exploded pictorial view of a hybrid light assembly according to one embodiment of the present invention.

With reference to the drawing figures, this section describes particular embodiments and their detailed construction and operation. Throughout the specification, reference to "one embodiment," "an embodiment," or "some embodiments" means that a particular described feature, structure, or characteristic may be included in at least one embodiment. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

Referring now to the various figures of the drawings, and first to FIG. 1, therein is shown at 10 a hybrid light assembly according to one embodiment of the present invention. The assembly 10 includes a reflector 12, which is generally parabolic. A primary light source 14 is situated at or near the base of the reflector 12 in order to project a relatively tightly focused, long-range beam of light. The primary light source 14 can be an incandescent, halogen, or high intensity discharge (HID) lamp or bulb. If necessary, an appropriate ballast 16 may be used in conjunction with the bulb of the primary light source 14.

A circumferential mounting member 18 is provided to extend outwardly from the open end 20 of the reflector 12. The mounting member 18 presents a plurality of circumferentially-spaced mounting surfaces 22 situated radially outwardly from the open end 20 of the reflector 12 when assembled.

A secondary light source 24 may be comprised of a plurality of light-emitting diodes (LEDs) 26 which are positioned on the mounting surfaces 22 of the mounting member 18 circumferentially around the open end 20 of the reflector 12. In the illustrated embodiment, the LEDs 26 are situated in pairs on each of the mounting surfaces 22. Each of the LEDs may be positioned within or integrally formed with a lens that directs light substantially normal (i.e., perpendicular) to the surface on which it is mounted. Each LED 26, or groups (such as pairs) thereof, may be mounted on a printed circuit board (PCB) and/or heat sink 28 for ease of assembly and operation according to well-known requirements.

For assembly, the LEDs 26 of the secondary light source 24 and reflector 12 are assembled to the mounting member 18, which is then assembled along with the primary light source 14 and ballast 16 (if required) into a housing 30. Access to service or replace the primary light source 14 may be gained through a rear opening 32 in the housing 30. The opening 32 may be closed with a removable cover 34 attached with a threaded fastener 36. A lens 38 is secured around its periphery to either the mounting member 18 (as shown) or housing 30.

Figure 2:
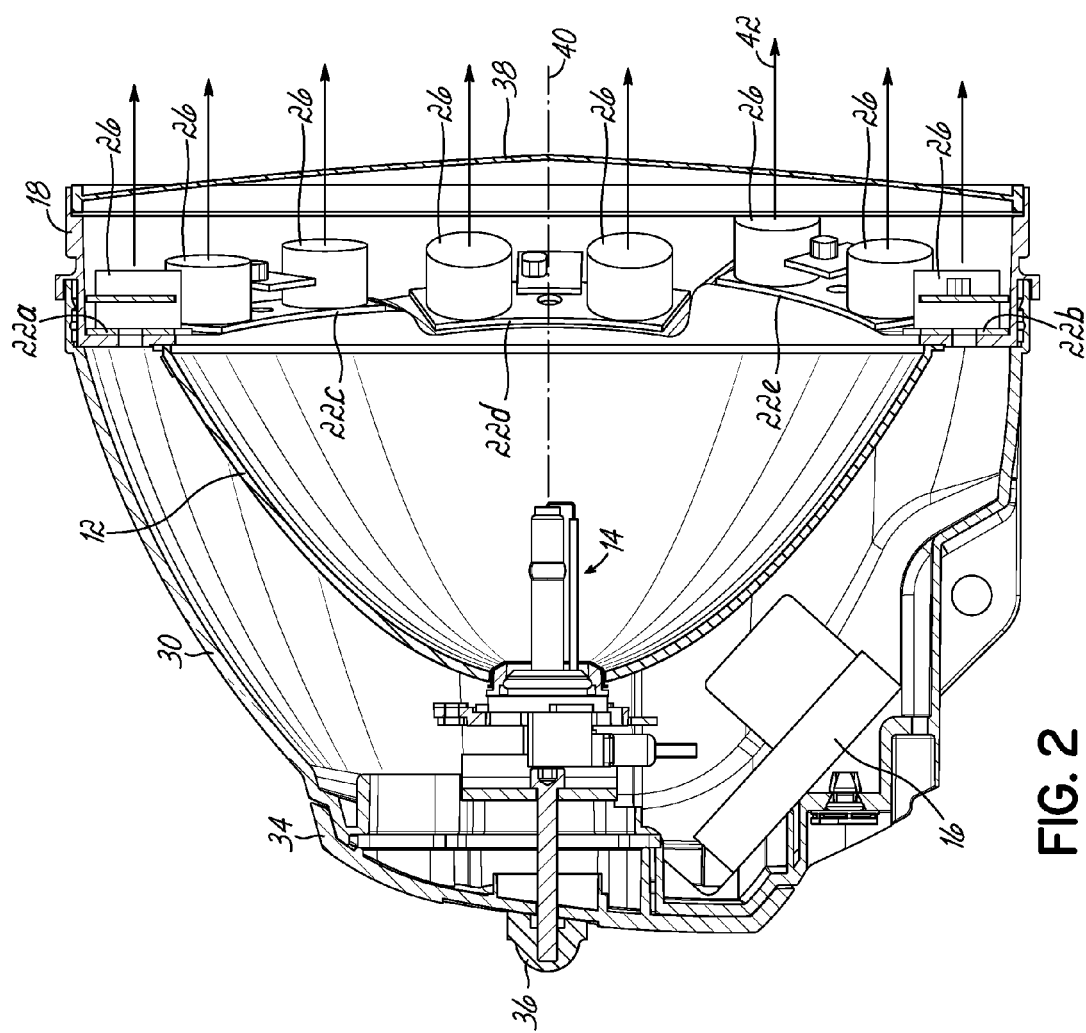
FIG. 2 is a side sectional view of the hybrid light assembly.
Figure 3:
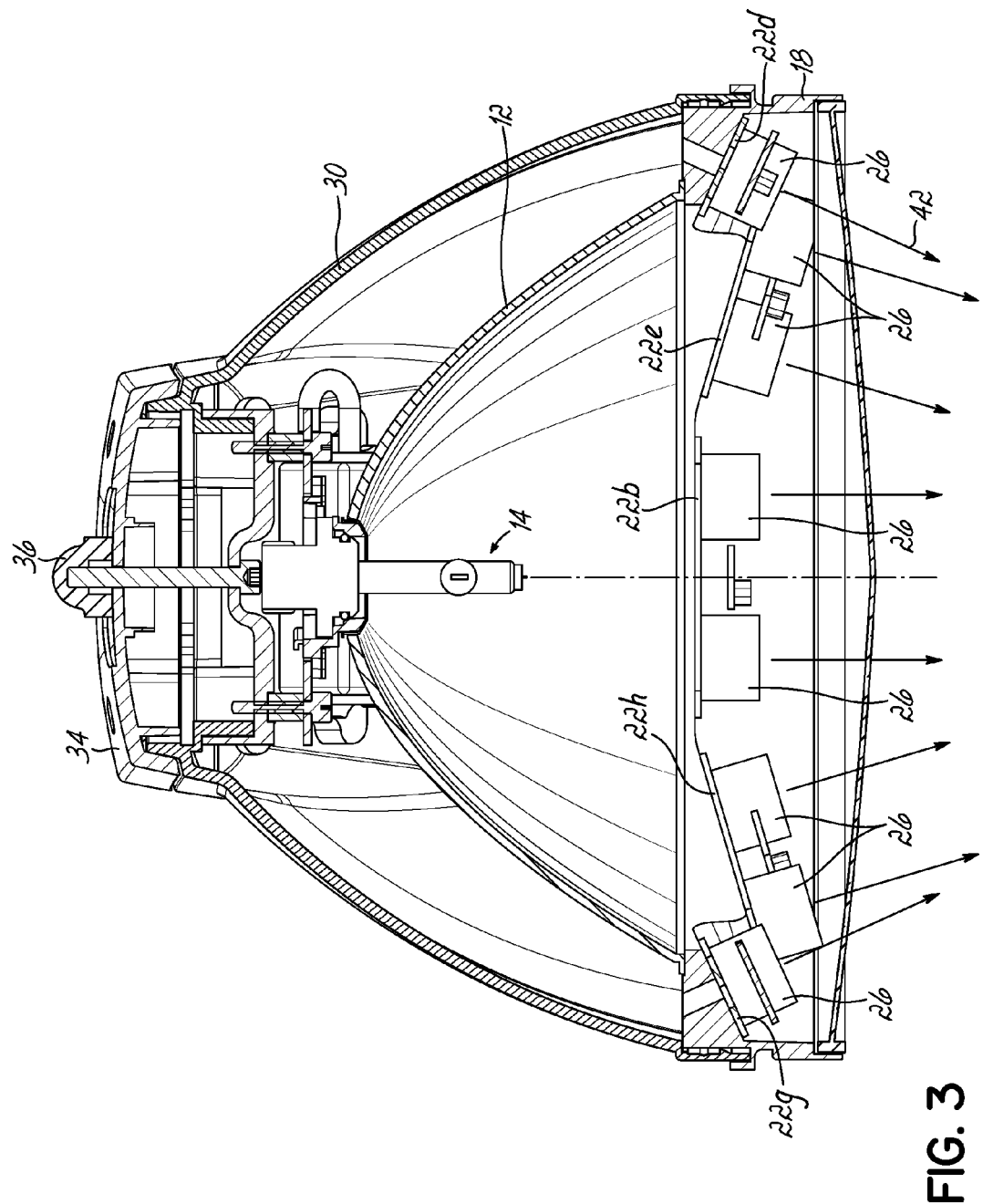
FIG. 3 is a top sectional view thereof.
Figure 4:
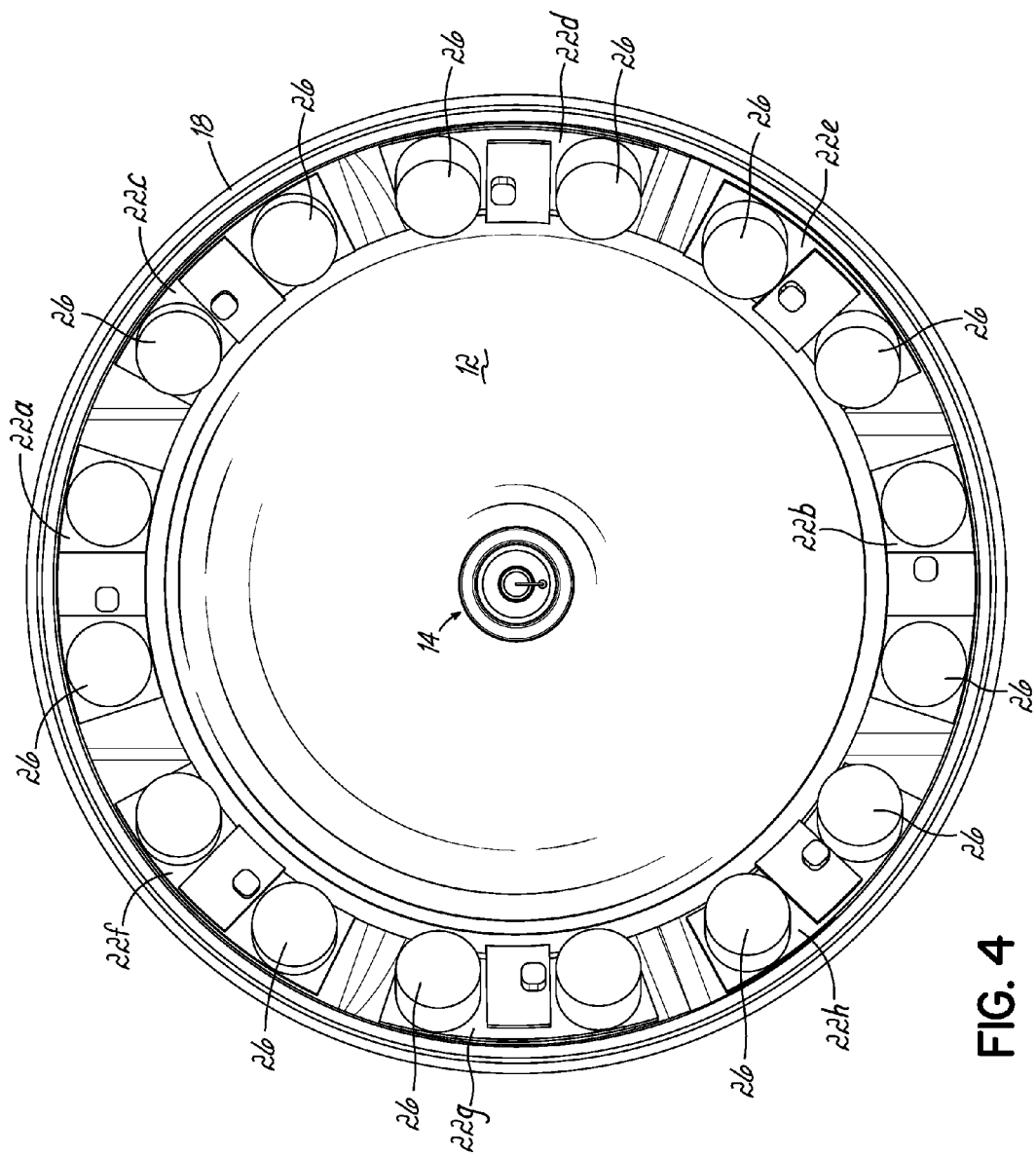
FIG. 4 is a front plan view thereof.
Figure 5:
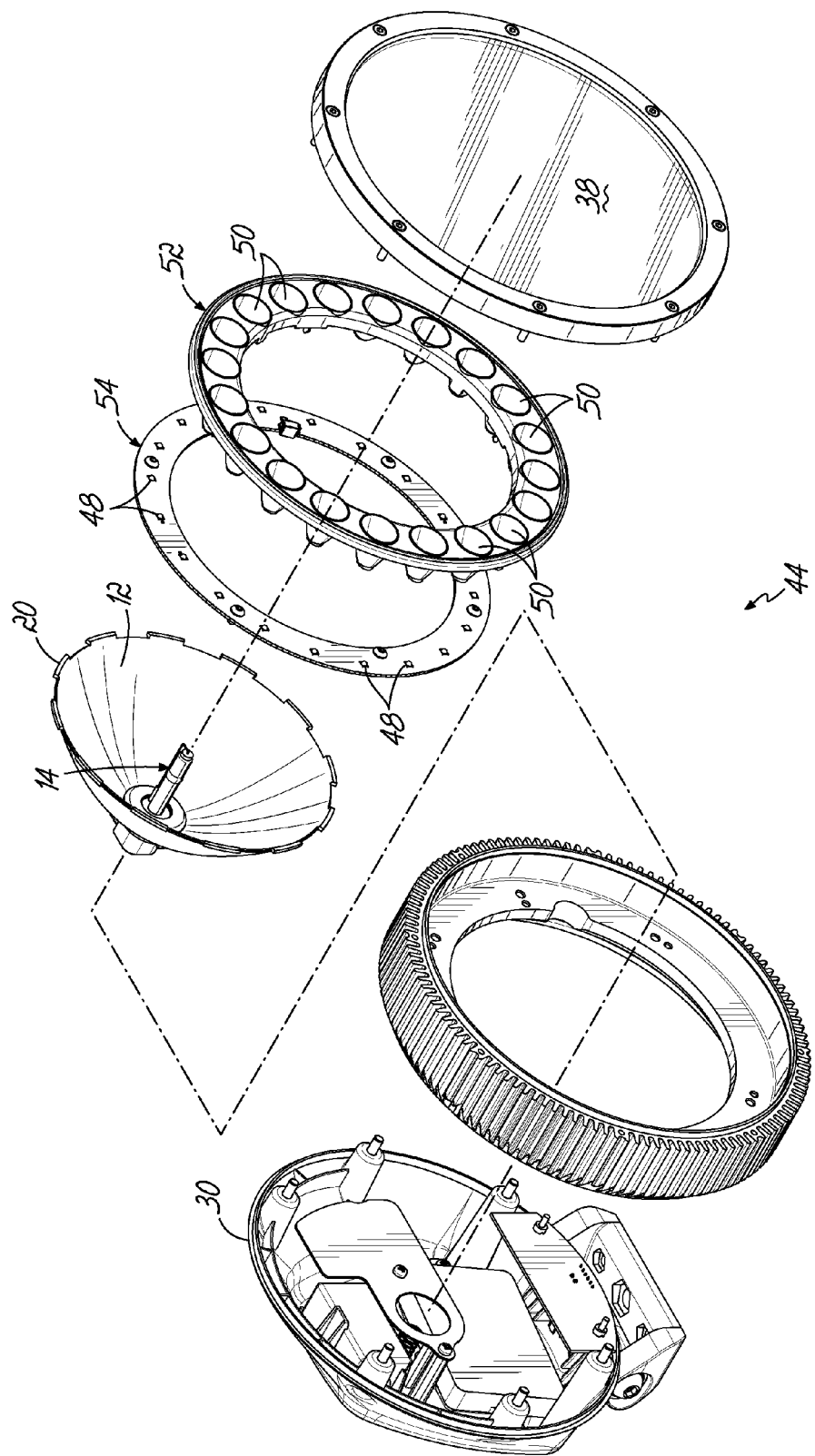
FIG. 5 is an exploded isometric view of an alternate embodiment.
Figure 6:
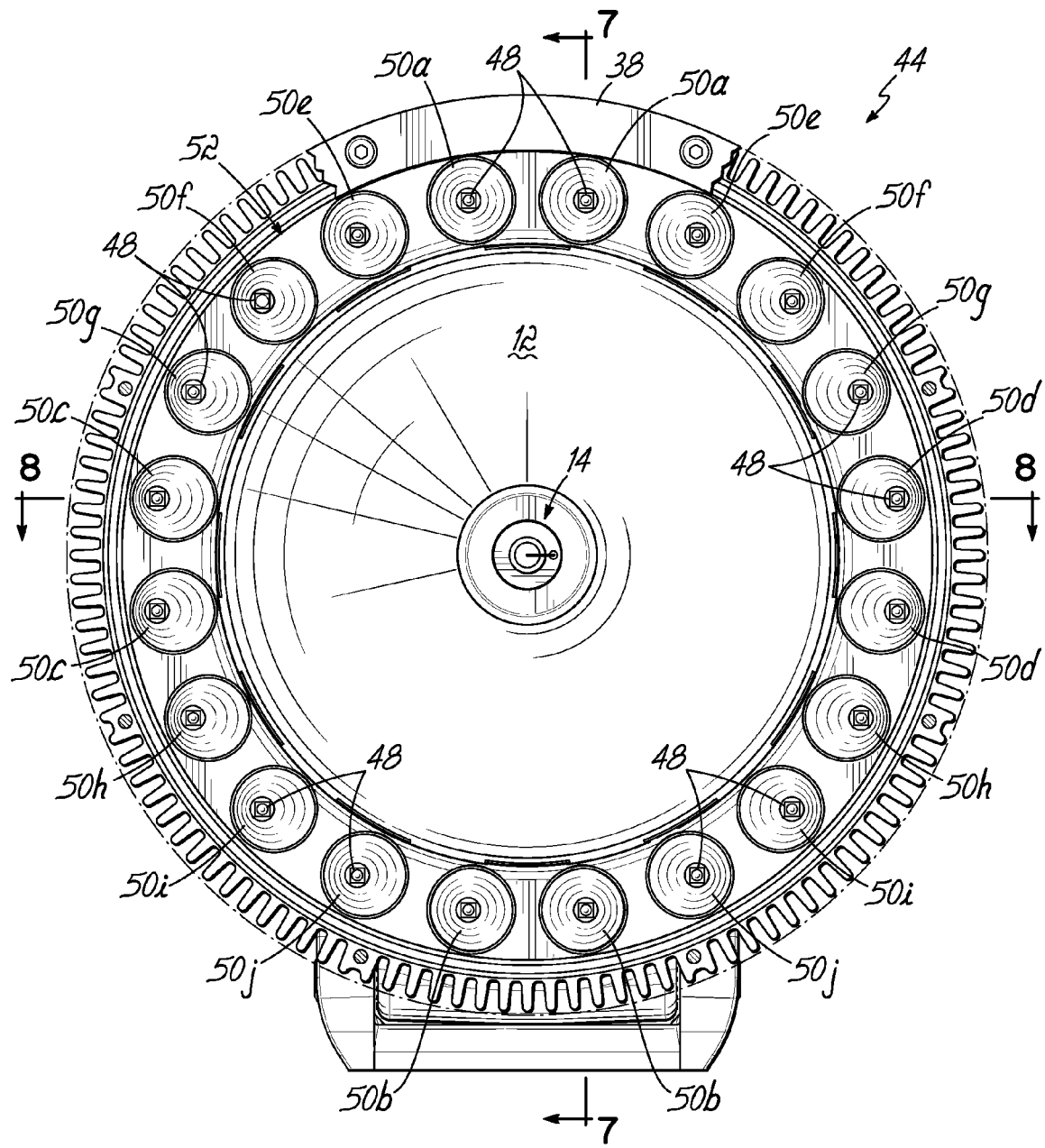
FIG. 6 is a front plan view thereof.

Referring now also to FIGS. 2-4, therein it can be seen that the substantially parabolic reflector 12 has an axis, indicated at 40, corresponding with the direction along which the primary light source 14 projects a long-range beam of light. The circumferential mounting member 18 presents a plurality of nonparallel mounting surfaces 22. Eight such mounting surfaces 22 are provided in the illustrated embodiment. The uppermost (22a) and lowermost (22b) mounting surfaces are substantially perpendicular to the axis 40 and the LEDs 26 of the secondary light source 24 mounted on these surfaces 22a, 22b project light in a direction substantially parallel to the axis 40. Each of the other six mounting surfaces 22c, 22d, 22e, 22f, 22g, 22h present mounting surfaces which are nonparallel to each other and to the upper and lower mounting surfaces 22a, 22b. In the illustrated embodiment, pairs of LEDs 26, mounted on a PCB/heat sink, are situated and attached to the mounting surfaces 22a-h to project light in a direction substantially normal to each of their respective mounting surfaces.

In one embodiment, each of the LEDs 26 includes a lens (either integral or attached) to project a substantial portion of the light produced in a direction normal to the base on which it is situated. As shown in FIGS. 2 and 3, the positioning of the LEDs 26 on the mounting surfaces 22 directs the light of each LED 26 primarily as shown by vector arrows 42. As illustrated in FIG. 2, the vertical component of this direction vector is substantially parallel to the axis 40 of the beam of light produced by the primary light source 14 and parabolic reflector 12. As illustrated in FIG. 3, the horizontal components of these direction vectors 42 are such that laterally positioned LEDs 26 project light which crosses the axis 40. In this manner, a more uniform "blanket" of light is produced at short range and over an area approximating a horizontal rectangle. Light from the secondary light source 24 is not significantly directed upwardly or downwardly where, at short distances, the light would not benefit the vehicle operator.

Referring now specifically to FIGS. 5-8, therein is shown at 44 a hybrid light assembly according to an alternate embodiment of the present invention. As in the previously described embodiment, the assembly 44 includes a primary reflector 12, which is generally parabolic, and a primary light source 14 is situated at or near the base of the reflector 12 in order to project a relatively tightly focused, long-range beam of light. The primary light source 14 may be an incandescent, halogen, or high intensity discharge (HID) lamp or bulb.

A secondary light source 46 is comprised of a plurality of light-emitting diodes (LEDs) 48, which are positioned circumferentially around the open end 20 of the primary reflector 12, and a plurality of substantially parabolic secondary reflectors 50 associated with the LEDs 48. The secondary reflectors 50 can be formed as a single unit 52, if desired. A circumferential mounting member 54 may be provided to extend outwardly from the open end 20 of the reflector 12 to support the LEDs 48 and secondary reflectors 50 or unit 52. Each of the secondary reflectors 50 directs a beam of light from its associated LED 48.

Figure 7:
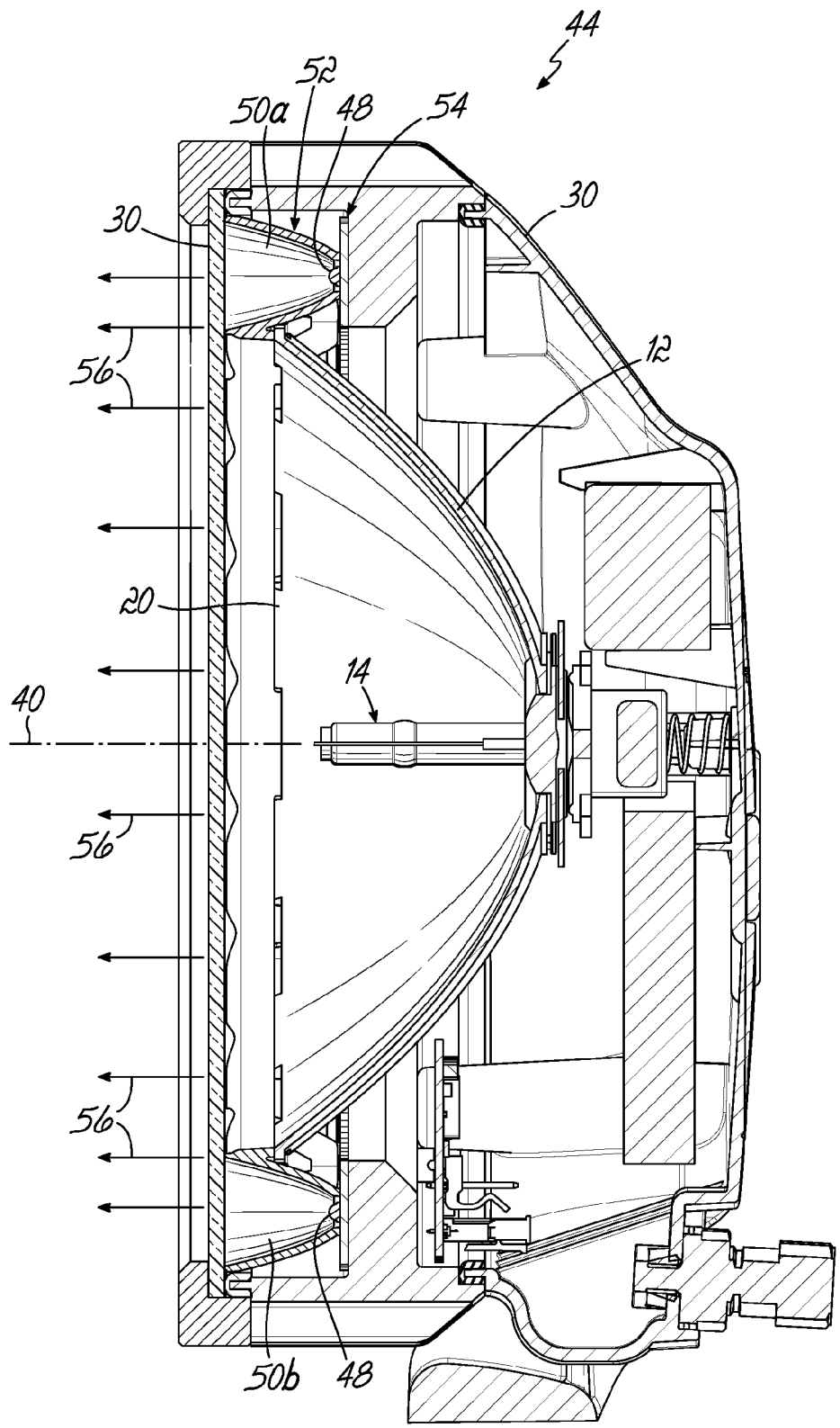
FIG. 7 is a side sectional view thereof taken substantially along line 7-7 of FIG. 6.
Figure 8:
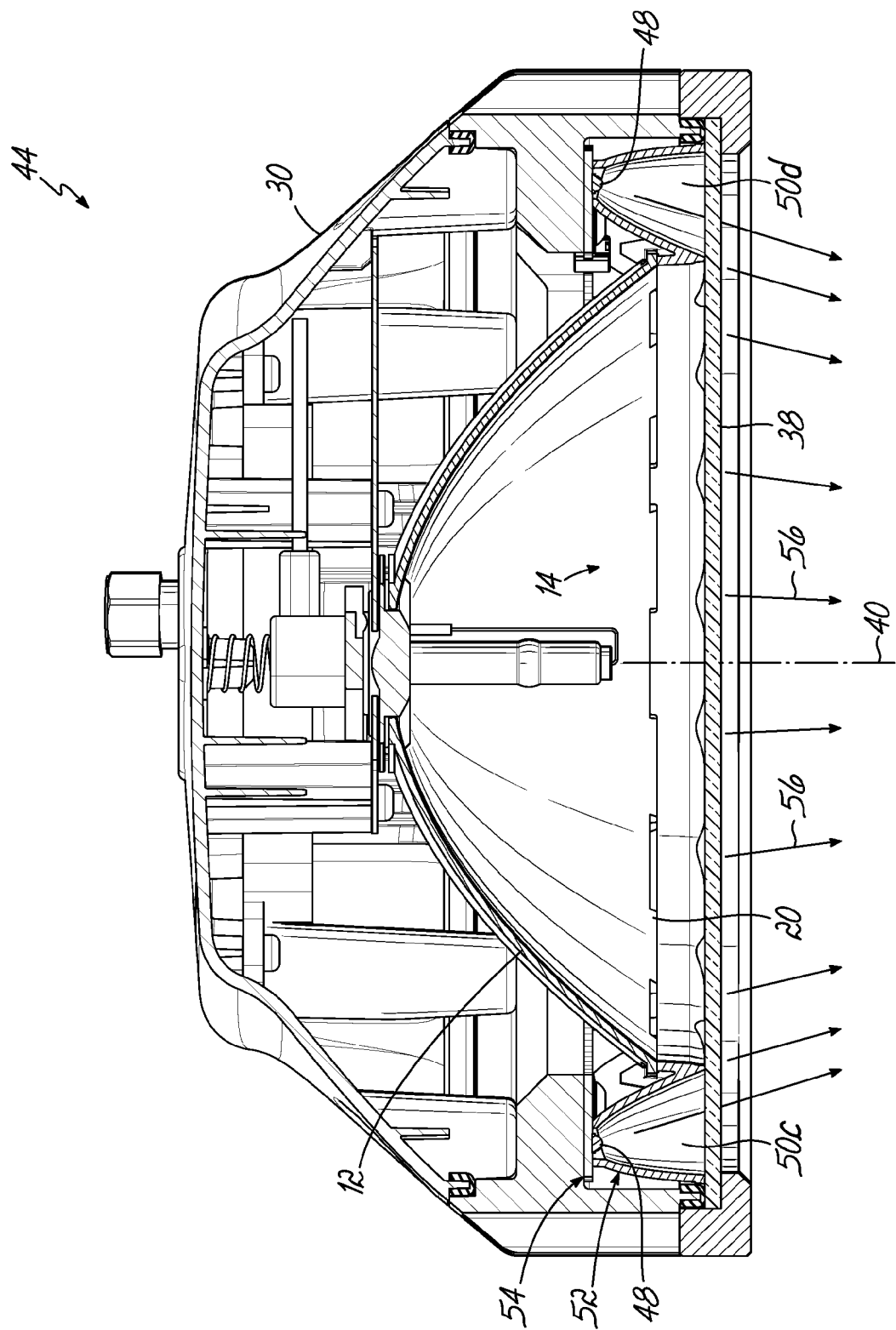
FIG. 8 is a top sectional view thereof taken substantially along line 8-8 of FIG. 6.

Referring now also to FIGS. 7 and 8, therein it can be seen that the primary reflector 12 has an axis, indicated at 40, corresponding with the direction along which the primary light source 14 projects a long-range beam of light. The circumferential series of secondary reflectors 50 directs a plurality of nonparallel light beams. Twenty such secondary reflectors 50 and LEDs 48 are provided in the illustrated embodiment. The uppermost pair (50a) and lowermost pair (50b) of secondary reflectors can project light beams that are substantially parallel to the axis 40. Left and right lateral pairs 50c, 50d of secondary reflectors may project light beams that are vertically substantially parallel to the axis 40, but that are horizontally angled to cross the beam from the primary light source 14. Each of the other twelve secondary reflectors 50e, 50f, 50g, 50h, 50i, 50j can be oriented to project secondary light beams which are nonparallel to each other and to the light beams of the upper and lower secondary reflectors 50a, 50b. Each of these other secondary reflectors may project light at horizontal angles progressively increasing from that of the uppermost and lowermost reflector pairs 50a, 50b (parallel to the axis 40) to the lateral pairs 50c, 50d (having the greatest horizontal angle relative to the axis 40). Vector arrows representing the relative orientation of the light beams from the secondary reflectors 50a-j in the horizontal and vertical planes are illustrated in FIGS. 7 and 8.

As shown in FIGS. 7 and 8, the orientation of the secondary reflectors 50 directs the light of each LED 48 primarily as shown by vector arrows 56. As illustrated in FIG. 7, the vertical component of the direction vectors is substantially parallel to the axis 40 of the beam of light produced by the primary light source 14 and primary parabolic reflector 12. As illustrated in FIG. 8, the horizontal components of these direction vectors 56 are such that laterally positioned LEDs 48 project light which crosses the axis 40. In this manner, a more uniform "blanket" of light is produced at short range and over an area approximating a horizontal rectangle. Light from the secondary light source 46 is not significantly directed upwardly or downwardly where, at short distances, the light would not benefit the vehicle operator.

While specific embodiments of the present invention have been described in detail, it should be apparent that modifications and variations thereto are possible, all of which fall within the true spirit and scope of the invention. Therefore, the foregoing is intended only to be illustrative of the principles of the invention. Further, since numerous modifications and changes will readily occur to those skilled in the art, it is not intended to limit the invention to the exact construction and operation shown and described. Accordingly, all suitable modifications and equivalents may be included and considered to fall within the scope of the invention, defined by the following claim or claims.

What is claimed is:

1. A hybrid lamp assembly, comprising:
a substantially parabolic reflector having an open end;
a primary light source operably assembled with the parabolic reflector to project a primary light beam; and
a secondary light source comprising a plurality of LED lamps positioned circumferentially around the open end and a plurality of substantially parabolic secondary reflectors associated with the plurality of LED lamps and configured to project secondary light beams, the LED lamps each being mounted to project light directed by the secondary reflector with which it is associated;

wherein upper and lower reflectors project light beams substantially parallel to the beam of the primary light source and lateral reflectors are angled inwardly in a horizontal plane to project light beams that cross the beam of the primary light source.

2. A hybrid lamp assembly according to claim 1, further comprising a housing in which the reflector, mounting member, reflector ring, and light sources are mounted.

3. A hybrid lamp assembly according to claim 2, further comprising a lens.

4. A hybrid lamp assembly according to claim 1, wherein the primary light source is configured to project a long-range beam of light and the LEDs of the secondary light source are configured to project a shorter range blanket of light.

* * * * *